(12) United States Patent  (10) Patent No.: US 8,732,524 B2
Barton et al.  (45) Date of Patent: May 20, 2014

(54) SYSTEMS AND METHODS FOR USING A CORRECTIVE ACTION AS DIAGNOSTIC EVIDENCE

(75) Inventors: Bradley John Barton, Albuquerque, NM (US); David Michael Kolbet, Scottsdale, AZ (US); Qingqiu Ginger Shao, Oro Valley, AZ (US); Randy R. Magnuson, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 268 days.

(21) Appl. No.: 13/197,132

(22) Filed: Aug. 3, 2011

(65) Prior Publication Data

US 2014/0082417 A1  Mar. 20, 2014

(51) Int. Cl.
G06F 11/07 (2006.01)

(52) U.S. Cl.
USPC .................. 714/26; 714/25; 714/47.1; 714/2

(58) Field of Classification Search
USPC ................................ 714/25, 26, 2, 47.1, 47.3
See application file for complete search history.

(56) References Cited

U.S. PATENT DOCUMENTS

| | | | |
|---|---|---|---|
| 4,866,635 A | 9/1989 | Kahn et al. | |
| 5,317,368 A | 5/1994 | Shimomura et al. | |
| 5,408,412 A | 4/1995 | Hogg et al. | |
| 5,748,497 A * | 5/1998 | Scott et al. | 702/181 |
| 5,835,871 A | 11/1998 | Smith et al. | |
| 5,922,079 A * | 7/1999 | Booth et al. | 714/26 |
| 6,622,264 B1 | 9/2003 | Bliley et al. | |
| 6,633,782 B1 * | 10/2003 | Schleiss et al. | 700/26 |
| 6,751,536 B1 | 6/2004 | Kipersztok et al. | |
| 6,810,312 B2 | 10/2004 | Jammu et al. | |
| 6,988,011 B2 | 1/2006 | Varma et al. | |
| 7,139,676 B2 * | 11/2006 | Barford | 702/183 |
| 7,143,316 B2 * | 11/2006 | Christodoulou et al. | 714/43 |
| 7,707,058 B2 | 4/2010 | Suermondt et al. | |
| 8,024,609 B2 * | 9/2011 | Suffern | 714/25 |
| 8,024,610 B2 * | 9/2011 | de Kleer | 714/26 |
| 8,281,186 B1 * | 10/2012 | Karafotis | 714/26 |
| 8,375,255 B2 * | 2/2013 | Wang et al. | 714/47.1 |
| 8,533,537 B2 * | 9/2013 | Nemecek et al. | 714/47.3 |
| 2002/0007237 A1 | 1/2002 | Phung et al. | |
| 2010/0121520 A1 * | 5/2010 | Yukawa et al. | 701/29 |
| 2010/0198610 A1 | 8/2010 | Khalak et al. | |
| 2010/0198771 A1 | 8/2010 | Khalak et al. | |

OTHER PUBLICATIONS

European Patent Office, European Search Report for Application No. 12/169,893.0 dated Nov. 5, 2012.
EP Office Action, EP12169893.0-1225 dated Jan. 14, 2013.

* cited by examiner

*Primary Examiner* — Joseph Schell
(74) *Attorney, Agent, or Firm* — Ingrassia Fisher & Lorenz, P.C.

(57) ABSTRACT

Methods, systems and computing devices are provided for using a completed corrective action as evidence of a fault. The methods, systems and computing devices receive equipment status evidence and determine an equipment fault based on the equipment status evidence. The methods, systems and computing devices also create and rank a list of potential failure modes based at least in part on the determined equipment fault, recommend a corrective action to correct the equipment fault based at least in part on the ranking of the potential failure modes and receiving additional equipment status evidence indicating that the recommended corrective action failed to correct the equipment fault. The methods, systems and computing devices then associate a detection probability and a false negative rate with the failed corrective action to create additional status evidence, and re-rank the list of potential failure modes for subsequent performance based on the additional status evidence.

21 Claims, 4 Drawing Sheets

SYSTEMS AND METHODS FOR USING A CORRECTIVE ACTION AS DIAGNOSTIC EVIDENCE

STATEMENT REGARDING FEDERALLY SPONSORED RESEARCH OR DEVELOPMENT

This invention was made with Government support under W56 HZV-05-C-0724 awarded by the United States Army. The Government has certain rights in this invention.

TECHNICAL FIELD

The present invention generally relates to condition based maintenance (CBM) systems, and more particularly relates to the use of indications of unsuccessful corrective actions as additional diagnostic evidence.

BACKGROUND

In preventive maintenance and mission planning, it is important to determine the likelihood of failures in a monitored system as symptoms (i.e., evidence) are observed. Since many failures frequently have overlapping evidence, it is often the case that ambiguity in fault reasoning will exist when trying to find the root cause failure. For example, the ambiguity can indicate that two system components have failed but there is no way to determine if one or the other or both are the true cause of a fault without the use of complex, and thus expensive, software.

Accordingly, it is desirable to reduce fault detection ambiguity by providing new and additional evidence to disambiguate two or more failure modes. In addition, it is desirable to provide a means for establishing such evidence. Furthermore, other desirable features and characteristics of the present invention will become apparent from the subsequent detailed description of the invention and the appended claims, taken in conjunction with the accompanying drawings and this background of the invention.

BRIEF SUMMARY

A method using a completed corrective action as evidence of a fault by a diagnostic reasoner is provided. The method comprises receiving equipment status evidence and determining an equipment fault based on the equipment status evidence. The method further comprises creating and ranking a list of potential failure modes based at least in part on the determined equipment fault, recommending a corrective action to correct the equipment fault based at least in part on the ranking of the potential failure modes and receiving additional equipment status evidence indicating that the recommended corrective action failed to correct the equipment fault. The method also comprises associating a detection probability and a false negative rate with the failed corrective action to create additional status evidence, and re-ranking the list of potential failure modes for recommendation of a subsequent corrective action to be performed based on the additional status evidence.

A system is provided for using a completed corrective action as evidence of a fault. The system comprises an equipment status determination means and a computing device. The computing device is configured to determine an equipment fault based on equipment status evidence received from the equipment status determination means, receive an indication that a first corrective action for the equipment fault has failed and associate a detection probability and a false negative rate with the failed corrective action thereby creating additional equipment status evidence. The system then re-ranks and determines a second corrective action based at least in part on the additional equipment status evidence.

A computing device is provided. The computing device is configured to receive equipment status evidence from an equipment status determination means, determine an equipment fault based on the equipment status evidence and create and rank a list of potential failure modes based at least in part on the determined equipment fault. The computing device is also configured to recommend a corrective action to correct the equipment fault based at least in part on the ranking of the potential failure modes, receive an indication that the recommended corrective action failed to correct the equipment fault and associate a detection probability and a false negative rate with the failed corrective action to create additional equipment status evidence. The computing device then re-ranks the list of potential failure modes for recommendation of a subsequent corrective action to be performed based on the additional equipment status evidence.

A computer based method is provided that uses a history of validated faults and completed corrective actions to compute a detection probability and false negative rate for a corrective action associated with an equipment fault model. The method comprises collecting and analyzing data associated with a corrective action, a corrective action success rate a modeling error and an actual defect rate in regard to an associated validated fault in a complex system over a period of time. The method then determines an actual defect rate of a component of the complex system from the data, determines a modeling error of the equipment default model from the data, determines a corrective action success rate from the data, and determines a corrective action count from the data. The method also sums the actual defect rate and the modeling error thereby determining that detection ration for the corrective action and subtracts the corrective action count from the corrective action success rate and dividing the subtrahend to determine a difference and dividing the difference by the corrective action count.

BRIEF DESCRIPTION OF THE DRAWINGS

The present invention will hereinafter be described in conjunction with the following drawing figures, wherein like numerals denote like elements.

DETAILED DESCRIPTION

Figure 1:
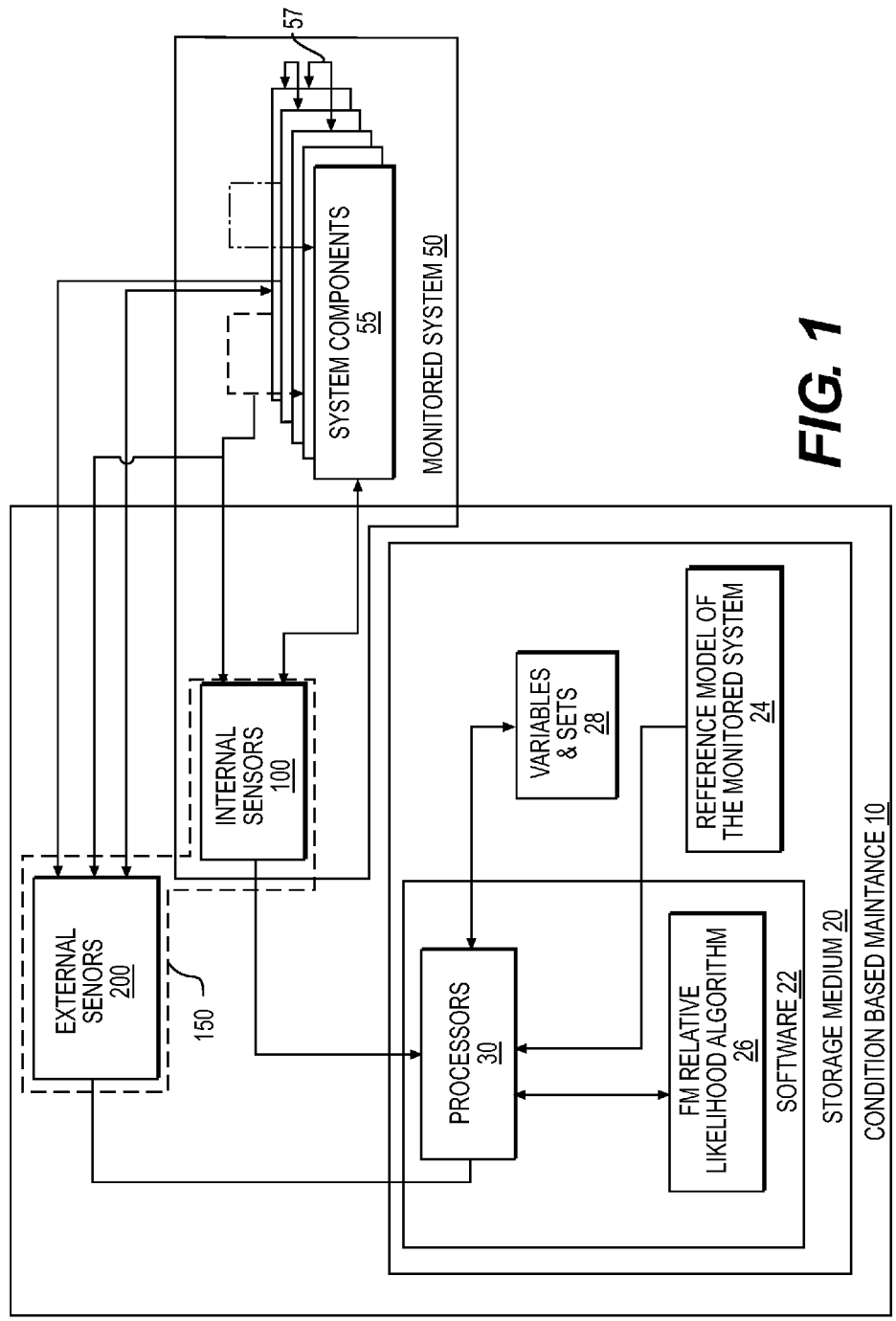
FIG. 1 is a block diagram of an exemplary condition based maintenance system in accordance with the subject matter described herein.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The word "exemplary" is used exclusively herein to mean "serving as an example, instance, or illustration." Any embodiment described herein as "exemplary" is not necessarily to be construed as preferred or advantageous over other embodiments.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

There is often ambiguity in reasoning to determine a root cause failure in a monitored system. The failure-mode-relative-likelihood algorithm described herein computes the probability of a hypothesized pattern of failure modes (that are based on given evidence observations) relative to a null hypothesis of no active failure modes to determine the relative probability of failure for each failure mode in the monitored system. As defined herein, the hypothesized pattern of failure modes is a candidate hypothesis. Many possible candidate hypotheses are evaluated when determining the relative probability of failure for each failure mode in the monitored system. Exemplary failure-mode-relative-likelihood algorithms are further described in co-owned, co-pending application Ser. Nos. 12/366,475 and 12/366,472, which are incorporated here in their entirety.

The failure-mode-relative-likelihood algorithm solves a binary many-to-many probabilistic fault isolation problem in which many elements of evidence can suggest a single failure mode and conversely, each element of evidence can suggest multiple failure modes. Moreover, the failure-mode-relative-likelihood algorithm uses the evidence observed and known system relationships to calculate a likelihood of a failure occurrence. This algorithm improves isolation of failures physically present at the time of diagnosis.

The failure-mode-relative-likelihood algorithm uses probability theory to resolve two primary complications of the reasoning tasks. First, the failure-mode-relative-likelihood algorithm resolves a situation in which there are many elements of evidence that suggest the same failure mode, and in which some of the elements disagree. Second, the failure-mode-relative-likelihood algorithm can be used to determine which failure mode exists when the elements of evidence suggest multiple failure modes. In some cases, more than one failure mode is responsible for a failure in the monitored system. In this case, the failure-mode-relative-likelihood algorithm is implemented to resolve for the plurality of failure modes as is described in detail in the co-owned, copending application Ser. No. 12/366,472. The failure-mode-relative-likelihood algorithm may be a combination of a Noisy-OR model and a Bayesian reasoner. The failure-mode-relative-likelihood algorithm is in model-based software that uses a reference model of the monitored system, which is referred to herein as a complex system (i.e., monitored system).

The reference model of the complex system models all critical aspects of the including the electronics, the physical structure of the parts of the complex system, the connectivity between the parts of the complex system, the function provided by each part of the complex system, and the kinds of failures each part can experience. The model correlates information indicative of failures from sensors. The sensors may be connected in a many-to-many relationship to the failure modes. The sensors may be Boolean YES or NO (alternatively referred to as ON or OFF) monitors that output a binary indication of the state of the monitored aspect of the reference model. In this manner, the sensors provide a statement of evidence from a lower level component in the complex system obtained during a built-in test of the components, parts, connections, etc. If a sensor is tripped, there is a condition of interest (e.g., the temperature is too high, a pressure on a part is too high, a connection) generated.

As defined herein, the "relative probability" is the probability normalized by the probability of a null hypothesis in which there are no active failure modes in the fault condition. The relative probability of a candidate hypothesis is used to determine a relative probability of a failure mode. Thus, the relative probability of a candidate hypothesis is the probability of the candidate hypothesis normalized by the probability of a null hypothesis. Likewise, the relative probability of a failure mode is the probability of the failure mode normalized by the probability of a null hypothesis. In one implementation of this embodiment, the monitored system is an aircraft. In another implementation of this embodiment, the complex system is a land vehicle or water-based vehicle.

FIG. 1 is a block diagram of one embodiment of a condition based maintenance (CBM) system 10 monitoring a monitored system 50 in accordance with one embodiment. The monitored system 50 includes at least one system component 55, and internal sensors 100, also referred to herein as monitors 100. The CBM 10 includes sensors represented generally at 150, at least one processor 30, and a storage medium 20 to store software 22 executable by the at least one processor 30. The sensors 150 include both the internal sensors 100 in the monitored system 50, and external sensors 200, which are external to the monitored system 50. The CBM 10 is configured to determine relative probabilities of failure in the monitored system 50. The at least one processor 30 is referred to herein as the processors 30. The sensors 150, internal sensors 100, and external sensors 200 are also referred to herein as monitors 150, internal monitors 100, and external monitor 200, respectively. Sensors 150 are a non-limiting example of an equipment status determination means, which may also include manual observation/input and ambient condition detection.

Some of the system components 55 are connected to others of the system components 55 via connections represented generally at 57. The connections can be wired or wireless. The sensors 150 are communicatively coupled to the system components 55 to monitor the system components 55. Likewise, the sensors 150 are communicatively coupled to each of the connections 57 between the various system components 55 to monitor the linking between two system components. In one implementation of this embodiment, the sensors 150 also monitor the environment of the monitored system 50

The sensors 150 generate equipment status evidence that is detected during the monitoring and supply the equipment status evidence to the processors 30. The processors 30 receive the equipment status evidence from the sensors 150. The processors 30 then generate an array of failure modes that form an ambiguity group of failure modes based on the equipment status evidence received from the sensors 150. The processors 30 also execute algorithms in the software 22 that are configured to generate information regarding unknown causes of failures.

The software 22 stored in the storage medium 20 includes a failure-mode-relative-likelihood algorithm 26. As shown in FIG. 1, the processors 30 may be hardware devices or may be embodied as a combination of hardware and software. The failure-mode-relative-likelihood algorithm 26 may be a combination of noisy-OR models and a naive Bayesian reasoner. A reference model of the monitored system 24 may be stored in the storage medium 20, but in equivalent embodiments the reference model may be stored remotely. In some embodiments, the storage medium also stores variables and data sets 28 generated by the processors 30.

In some embodiments, the monitored system 50 is an aircraft. In other equivalent embodiments, the complex system is a land or waterborne vehicle. The processors 30 execute the software 22 and/or firmware that causes the processors 30 to perform at least some of the processing described here as being performed by the CBM 10. At least a portion of such software 22 and/or firmware executed by the processors 30 and any related data structures are stored in storage medium 20 during execution. In some embodiments, the processors 30 include a memory (not shown) that comprises any suitable memory now known in the art or that may be developed in the future such as, for example, random access memory (RAM), read only memory (ROM), and/or registers within the processors 30. In one implementation, the processors 30 comprise microprocessors or microcontrollers. The software 22 and/or firmware executed by the processors 30 comprises a plurality of program instructions that are stored or otherwise embodied on a storage medium 20 from which at least a portion of such program instructions are read for execution by the processors 30. In at least one embodiment, the processors 30 comprise processor support chips and/or system support chips such as application-specific integrated circuits (ASICs).

Figure 2:
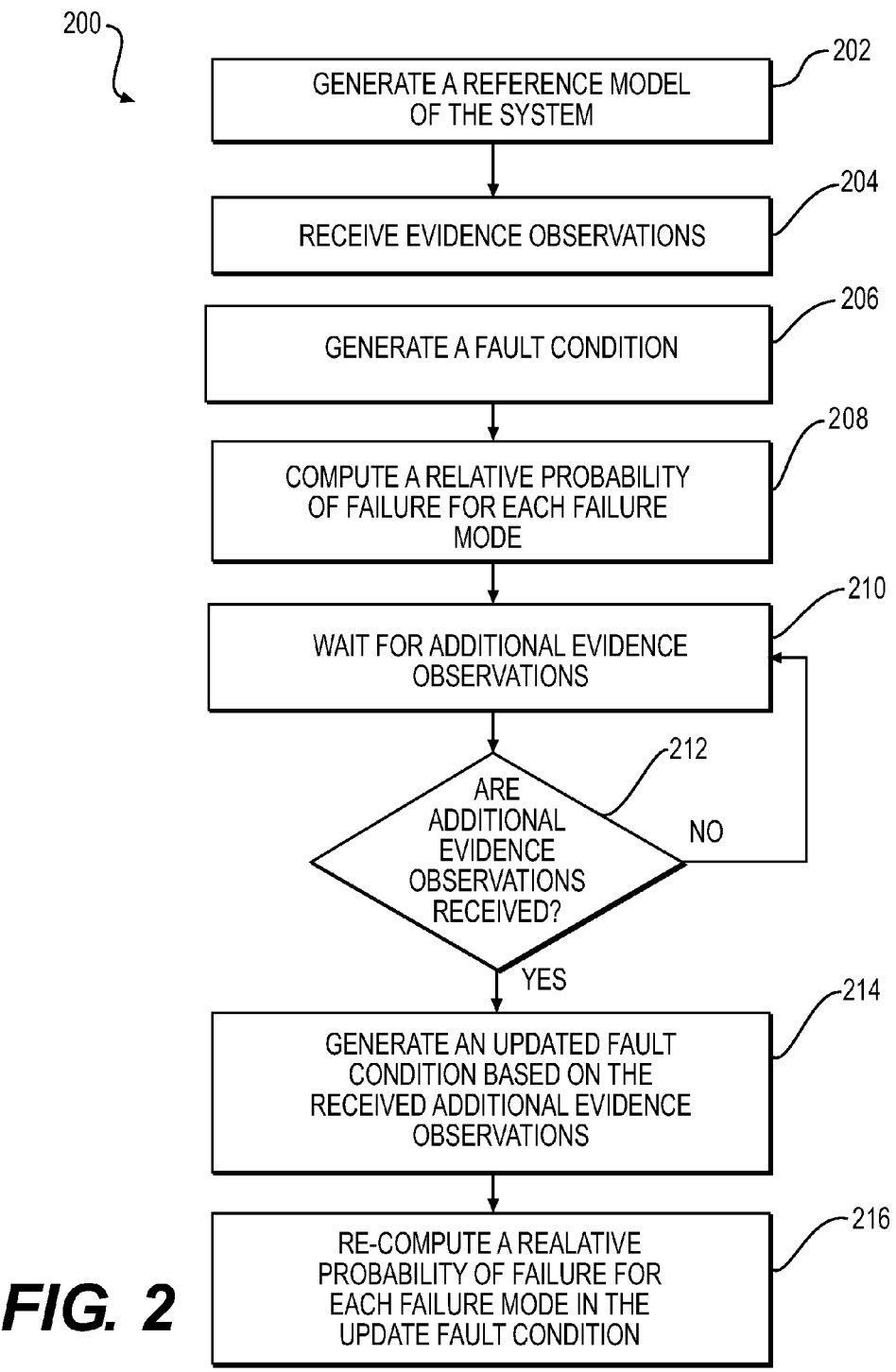
FIG. 2 is a flow diagram of an exemplary method for determining relative likelihood of a failure mode.

FIG. 2 is a flow diagram of a method 200 for determining relative likelihood of a failure mode based on initial data for a reference model of the monitored system and received equipment status evidence. In at least one embodiment, the method 200 is implemented by the CBM 10 to monitor the monitored system 50 shown in FIG. 1 although it is to be understood that method 200 can be implemented using other embodiments of the monitored system 50 and the CBM 10 as would be appreciated by one skilled in the art after having read this specification.

At process 202, a reference model of the monitored system 50 is generated or accessed remotely by the processors 30. The reference model can be generated based on data received from vendors of the system components 55, as well as from test data taken during a build of the monitor system 50. In at least one implementation of this embodiment, the reference model of the monitored system 50 is generated by the processors 30. In another implementation of this embodiment, the reference model of the monitored system 50 is generated external to the CBM 10 and is downloaded into the CBM 10.

At process 204, evidence observations of the monitored system 50 are received from sensors 150 at the processors 30. Evidence observations are physical parameter values detected by a sensor such as vibration, temperature, time, pressure, etc. The sensors 150 may be associated in a many-to-many relationship with the failure modes. As is generally known, a many-to-many relationship is one in which multiple sensors are related to multiple failure modes and vice versa. An example of such a relationship is a school where teachers teach students. In most schools each teacher can teach multiple students and each student can be taught by multiple teachers.

At process 206, a fault condition comprising states of all failure modes for a reference model of the monitored system 50 is generated based on the received evidence observations. The fault condition is an ambiguity group of failure modes. The processors 30 implement model-based software 22 to generate the fault condition for the states-of-failure modes for the reference model of the monitored system 50.

At process 208, a relative probability of failure for each failure mode is computed based on three factors. These three factors include, for example, a false negative probability, a detection probability, and a ratio of prior probabilities of a candidate hypothesis to a null hypothesis that there are no active failure modes. Thus, at least one processor 30 generates the ratio of the prior probabilities of each candidate hypothesis to the null hypothesis, generates a trigger factor associated with triggered monitors in the fault condition, and generates a quiescent factor associated with quiescent monitors in the fault condition. The manner by which these factors may be generated and applied is described more fully in copending, co-owned application Ser. No. 12/366,475 and will not be discussed further herein in the interest of brevity and clarity.

At process 210, the CBM 10 waits to receive additional evidence observations. If no additional evidence observations are received, then none of the sensors 150 are triggered by a change in state of the monitored system 50. At process 212, it is determined if additional evidence observations were received. If no additional evidence observations were received, the CBM 10 maintains a waiting state by looping from process 210 to process 212 and back to process 210 until additional evidence observations are received. If additional evidence observations were received, the flow proceeds to process 214. Additional evidence observations may comprise updated equipment status evidence or new equipment status evidence and will be discussed further below.

At process 214, an updated fault condition comprising states of all failure modes for the reference model of the monitored system is generated based on the additional evidence observations received from the sensors 150. An updated ambiguity group of failure modes is formed from the updated fault condition. The processors 30 implement model-based software 22 to generate the updated fault condition for the states-of-failure modes for the reference model of the monitored system.

At process 216, a relative probability of failure for each failure mode in the updated fault condition is re-computed based on three factors. These three factors include the false negative probability, the detection probability, and the ratio of prior probabilities of the candidate hypothesis to a null hypothesis of no active failure modes.

Thus, at least one processor 30 my regenerate a trigger factor associated with triggered monitors in the updated fault condition, may regenerate a quiescent factor associated with quiescent monitors in the updated fault condition, and may regenerate the ratio of the prior probabilities of each candidate hypothesis to the null hypothesis. The processors 30 then determine the relative probability of failure based on the regenerated trigger factor, quiescent factor, and ratio of the prior probabilities of the candidate hypothesis to the null hypothesis. The manner by which these factors are regenerated is more fully described in co-owned, copending application Ser. No. 12/366,475.

Figure 3:
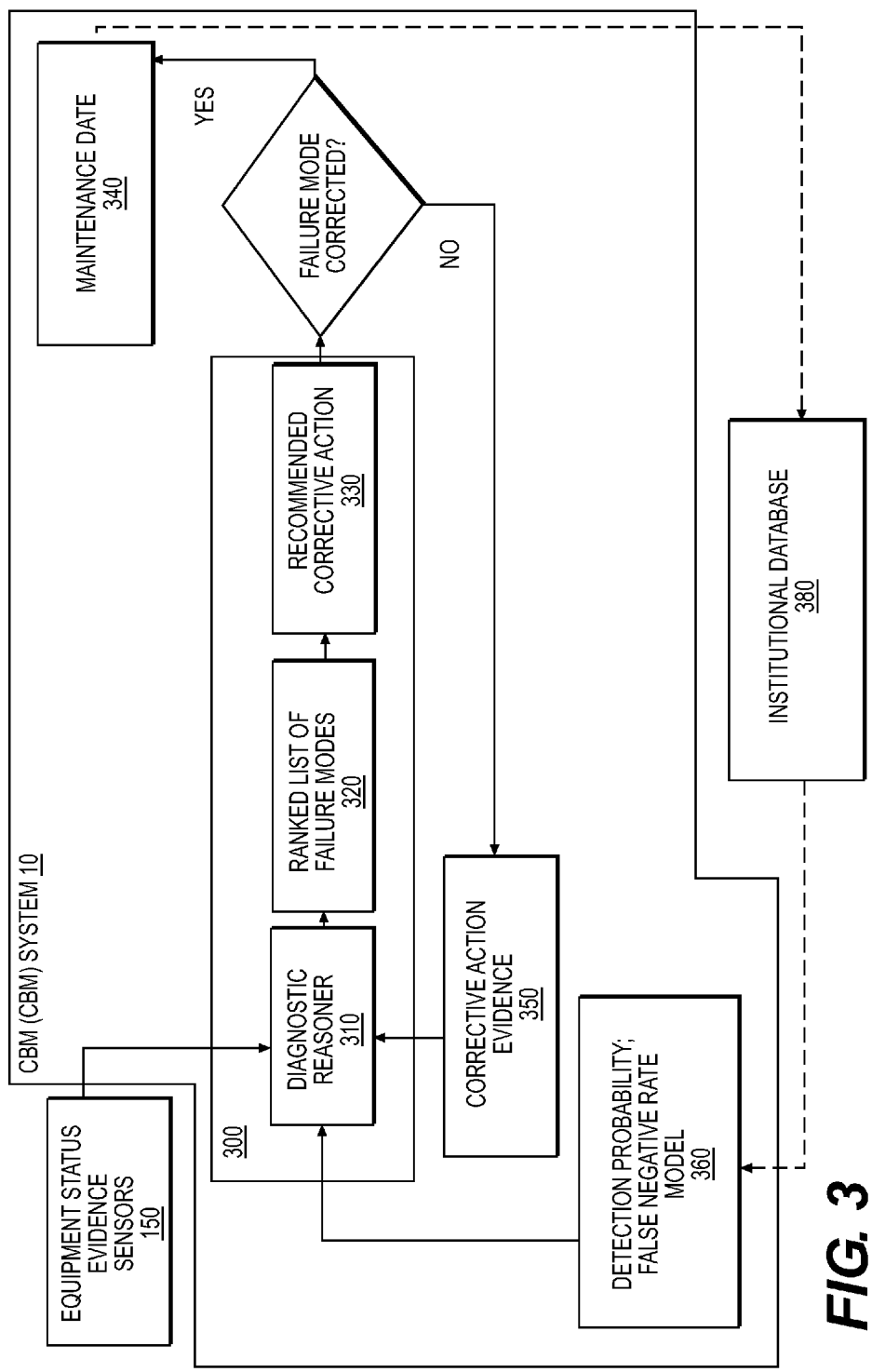
FIG. 3 is a simplified functional block diagram of an exemplary system that uses a completed corrective action as an additional equipment status evidence of a fault.

FIG. 3 is a simplified functional block diagram of an exemplary embodiment that uses a completed corrective action as an additional evidence observation of a fault. The system includes the internal and external sensors 150, a CBM reasoner 300, a reference equipment fault model 360 of the monitored system 24 and an institutional or back office database server 380.

The CBM reasoner 300 may be any suitable health maintenance/condition based maintenance reasoner known in the art or that may be developed in the future and may or may not include processor 30 being contained therein. The CBM reasoner 300 includes a diagnostic reasoner 310 that is configured to generate a ranked list of failure modes 320 determined from the reference fault model 360 of the monitored system 24 and any equipment status evidence received from sensors 150 or other equipment status determination means. The diagnostic reasoner 310 may be software 22. Among other functions, the diagnostic reasoner 310 is configured to recommend a corrective action 330 to be executed by maintenance personal that is most likely to clear the fault mode as discussed above.

In CBM systems, diagnostic algorithms executed by a diagnostic reasoner provide fault isolation. At the point of isolation, a corrective action is presented to the maintainer to correct the fault. Once this corrective action is completed, the optimum result is that the fault clears. However, this is not always the case as the corrective action may have failed to repair the root cause of the failure mode. This failure may be due to fault misidentification, effective parts, or the incorrect execution of the corrective action. Thus, additional equipment status evidence may be created to indicate the probability that the corrective action has not cleared the fault and allow for a recommendation of a follow on corrective action.

New or additional equipment status evidence may be created by transforming an indication of an unsuccessful corrective action into maintenance data 340 and/or corrective action "evidence" 350 in the same format as equipment status evidence gathered from other conventional sources such as built-in-test (BIT) results, sensor indications and diagnostic conclusions from other system diagnostic engines. An exemplary, non-limiting format for corrective action evidence 350 includes associating a corrective action failure indication with a probability of detection and a false negative rate.

A probability of detection of the fault being corrected and a false negative rate can be retrieved from a centralized institutional database 380 to become integrated into the equipment fault model 360 and assigned to an indication that a corrective action has been completed and failed. These probabilities can be derived from actual data collected over time (days, months, years) by the manufacturer, or during equipment deployment, repair, and refurbishment phases. Measurements contributing to the derivation of these probabilities include, but are not limited to, manufacturing defect rate, success rate of the corrective action in clearing the fault, percentage of times corrective action is executed incorrectly, etc. and may be stored in persistent memory in the institutional database 380 or other suitable long term data store that may be located remotely from the complex system, such as a centralized maintenance facility. By assigning specific probabilities to this evidence type, the corrective action completion evidence can be incorporated in to the standard probabilistic diagnostic algorithms as another piece of equipment status evidence.

From the accumulated data in database 380, the false negative rate can be derived from the ratio that the corrective action was successful in clearing the fault, as well as the number of times the corrective action was chosen to solve the fault. Detection probability as defined herein is derived from a ratio the numerator of which is equal to the number of times the corrective action was performed on a validated fault (C) minus the number of instances where the corrective action successfully clears the validated fault (S) and the denominator which is number of times the corrective action was performed on a validated fault (C). The numerator of the ratio is the number of times the corrective action was performed incorrectly or a "false negative event" (C–S). Thus, the false negative rate is equal to the value determined by (C–S)/C. The false negative rate is a function of the corrective action only. A validated fault is a fault that has been proven to actually exist by analysis at centralized maintenance facility where detection probabilities and false negative rates are determined from accumulated fleet level data. A local maintenance system retrieves historical data from the centralized maintenance facility as required to perform the calculations disclosed herein, such as fault validation.

The detection probability as defined herein is a component defect rate, as may be provided by the part manufacturer or learned over time, plus a modeling error factor. The detection probability and is fault specific given a particular corrective action. Modeling error as defined herein is the difference in model fidelity between the complex system being monitored and the accuracy of its reference model 360. As non-limiting examples, modeling error may be introduced as the result of the wrong corrective action being recommended, the under-modeling of the complex system (i.e., rudimentary modeling), under-monitored systems or subsystems, and incorrect diagnosis programming.

Figure 4:
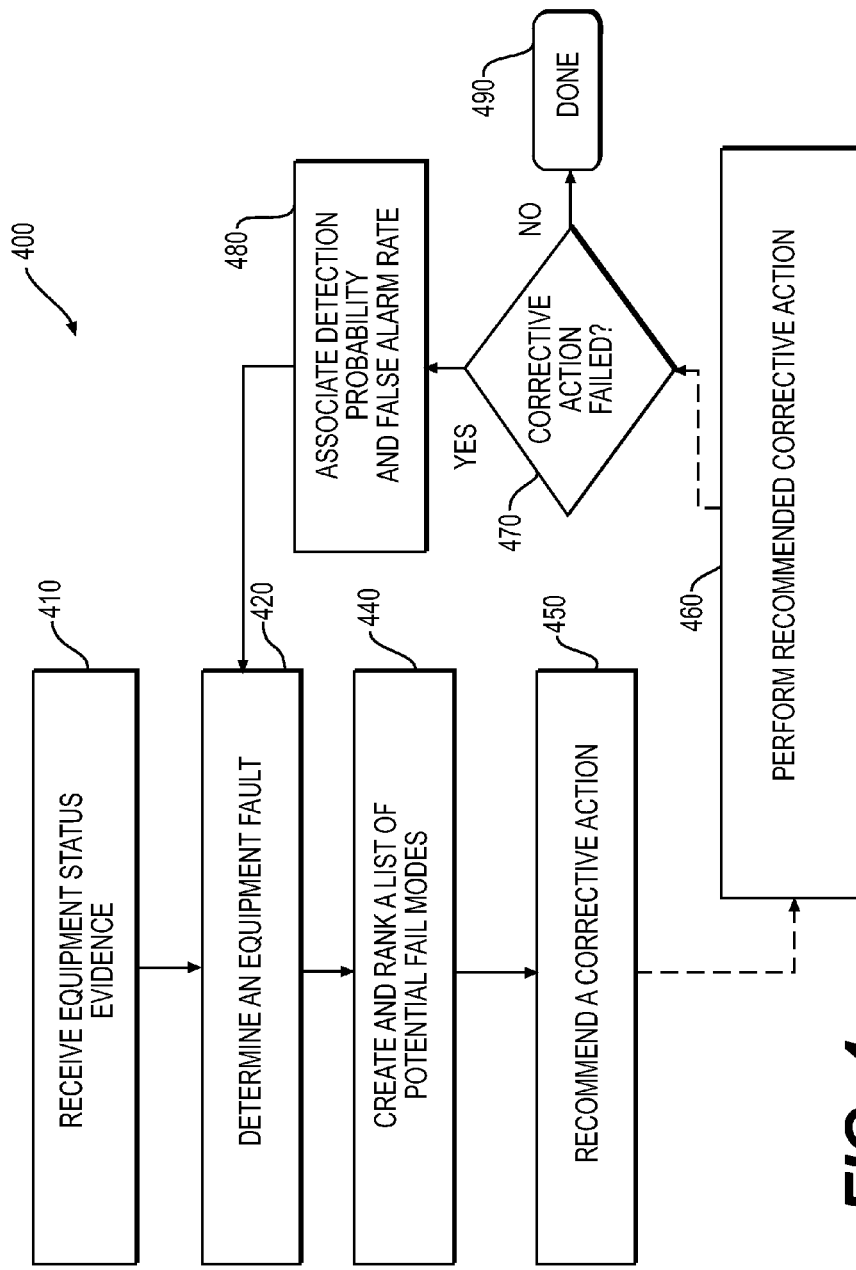
FIG. 4 is a logic flow diagram of an exemplary method for using the result of a corrective action as new and additional equipment status evidence.

FIG. 4 is a logic flow diagram of an exemplary method for using the result of a corrective action as new and additional equipment status evidence. At process 410, the diagnostic reasoner 310 receives equipment status evidence from the sensors 150 or other extraneous inputs that may be suitable as equipment status evidence. At process 420, an equipment fault is determined from the equipment status evidence received.

At process 440, the diagnostic reasoner produces a list of potential failure modes (i.e. an ambiguity set) that are ranked in the order of their probability of being the cause of the fault based on the equipment status evidence, the detection probability and false negative rate associated with each of the equipment status evidence received. The equipment status evidence, the detection probability and false negative rate may be associated by storing each in the same data record. The algorithm used to determine the ranking of the potential failure modes may be any suitable algorithm known in the art. In preferred embodiments, the algorithm may be the algorithm disclosed in co-owned application Ser. No. 12/366,475 and/or 12/366,472 as may, or may not, be modified by those of ordinary skill in the art.

At process 450, the diagnostic reasoner recommends a corrective action associated with the most probable failure mode in the list of potential failure modes determine in process 440. At process 460, the recommended corrective action is executed by maintenance personnel, or if capable of being executed in an automated fashion, executed automatically.

At process 470, a determination is made as to whether the corrective action failed or as successful. When successful, the method 400 ends at 490. When unsuccessful the method 400 proceeds to process 480.

At process 480, the diagnostic reasoner may consult the institutional database 380 to determine a detection probability corresponding to the corrective action attempted and the associate failure mode and to determine a false negative rate associated with the corrective action attempted. The detection rate and the false negative rate are associated with the failed corrective action in a manner similar to that used for other equipment status evidence to create additional equipment status evidence. The method 400 then proceeds to process 420 where the additional equipment status evidence is then used to re-evaluate the previously determined fault at process 420 and/or re-rank the list of potential failure modes at process 440 if the same equipment fault is confirmed at process 420.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method using a completed corrective action as evidence of a fault by a diagnostic reasoner, comprising:
    receiving equipment status evidence;
    determining an equipment fault based on the equipment status evidence;
    creating and ranking a list of potential failure modes based at least in part on the determined equipment fault;
    recommending a corrective action to correct the equipment fault based at least in part on the ranking of the potential failure modes;
    receiving additional equipment status evidence indicating that the recommended corrective action failed to correct the equipment fault;
    associating a detection probability and a false negative rate with the failed corrective action to create additional status evidence wherein the false negative rate is equal to a ratio, wherein the numerator of the ratio is equal to the number of times the corrective action was performed on a valid equipment fault minus the number of times the corrective action corrected the valid equipment fault, and the denominator is the number of times the corrective action was performed on a valid equipment fault; and
    re-ranking the list of potential failure modes for recommendation of a subsequent corrective action to be performed based on the additional status evidence.

2. The method of claim 1, wherein recommending a corrective action is selecting the corrective action associated with the failure mode with the highest relative probability of failure.

3. The method of claim 1, wherein the detection probability and false negative rates are retrieved from a remote persistent data store.

4. The method of claim 1, wherein the recommended corrective action and a successful corrective action are stored in a remote persistent data store.

5. The method of claim 1, wherein associating the detection probability and the false negative rate comprises storing the indication of the failed corrective action, the detection probability of the corrective action and the false negative rate in a common data record.

6. A system configured to use a completed corrective action as evidence of a fault, comprising:
an equipment status determination means;
a computing device configured to:
determine an equipment fault based on equipment status evidence received from the equipment status determination means;
create and rank a list of potential failure modes based at least in part on the determined equipment fault;
receive an indication that a first corrective action for the equipment fault has failed;
associate a detection probability and a false negative rate with the failed corrective action thereby creating additional equipment status evidence, wherein the false negative rate is equal to a ratio, wherein the numerator of the ratio is equal to the number of times the corrective action was performed on a valid equipment fault minus the number of times the corrective action corrected the valid equipment fault, and the denominator is the number of times the corrective action was performed on a valid equipment fault; and
re-rank and determine a second corrective action based at least in part on the additional equipment status evidence.

7. The system of claim 6, wherein an equipment status determination means is a sensor.

8. The system of claim 6, wherein an equipment status determination means is a manual input of an operator observation.

9. The system of claim 6, wherein an indication that the first corrective action has failed is a manual input of an operator observation.

10. The system of claim 6, wherein an indication that the first corrective action has failed is Built-in-Test (BIT) error indication.

11. The system of claim 6, wherein an indication that the first corrective action has failed is lack of a sensor input.

12. The system of claim 6, wherein an indication that the first corrective action has failed is a sensor input.

13. A computing device configured to:
receive equipment status evidence from an equipment status determination means;
determine an equipment fault based on the equipment status evidence;
create and rank a list of potential failure modes based at least in part on the determined equipment fault;
recommend a corrective action to correct the equipment fault based at least in part on the ranking of the potential failure modes from the list;
receive an indication that the recommended corrective action failed to correct the equipment fault;
associate a detection probability and a false negative rate with the failed corrective action to create additional equipment status evidence, wherein the false negative rate is equal to a ratio, wherein the numerator of the ratio is equal to the number of times the corrective action was performed on a valid equipment fault minus the number of times the corrective action corrected the valid equipment fault, and the denominator is the number of times the corrective action was performed on a valid equipment fault; and
re-rank the list of potential failure modes based on the additional equipment status evidence.

14. The computing device of claim 13, wherein recommending a corrective action is selecting the corrective action associated with the failure mode with the highest relative probability of failure.

15. The computing device of claim 13, wherein recommending a corrective action comprises selecting a corrective action associated with a subset of the potential failure modes with a highest combined relative probability of failure that share the same corrective action.

16. The computing device of claim 13, wherein an equipment status determination means is a manual input of an operator observation.

17. The computing device of claim 13, wherein an indication that the recommended corrective action has failed is a manual input of an operator observation.

18. The computing device of claim 13, wherein an indication that the recommended corrective action has failed is Built-in-Test (BIT) error indication.

19. The computing device of claim 13, wherein an indication that the recommended corrective action has failed is lack of a sensor input.

20. The computing device of claim 13, wherein an indication that the recommended corrective action has failed is a sensor input.

21. A computer based method using a history of validated faults and completed corrective actions to compute a detection probability and false negative rate for a corrective action associated with an equipment fault model, comprising:
over a period of time isolating, collecting and analyzing data associated with a corrective action, a corrective action success rate, a modeling error and an actual defect rate in regard to an associated validated fault in a complex system;
determining an actual defect rate of a component of the complex system from the data;
determining a modeling error of the equipment default model from the data;
determining a corrective action success rate from the data;
determining a corrective action count from the data;
summing the actual defect rate and the modeling error thereby determining that detection ration for the corrective action; and
subtracting the corrective action count from the corrective action success rate to determine a difference and dividing the difference by the corrective action count.

* * * * *